March 16, 1937.       H. J. BRANDENBURGER       2,073,828
CYCLE TIMER
Filed Dec. 24, 1931       10 Sheets-Sheet 1
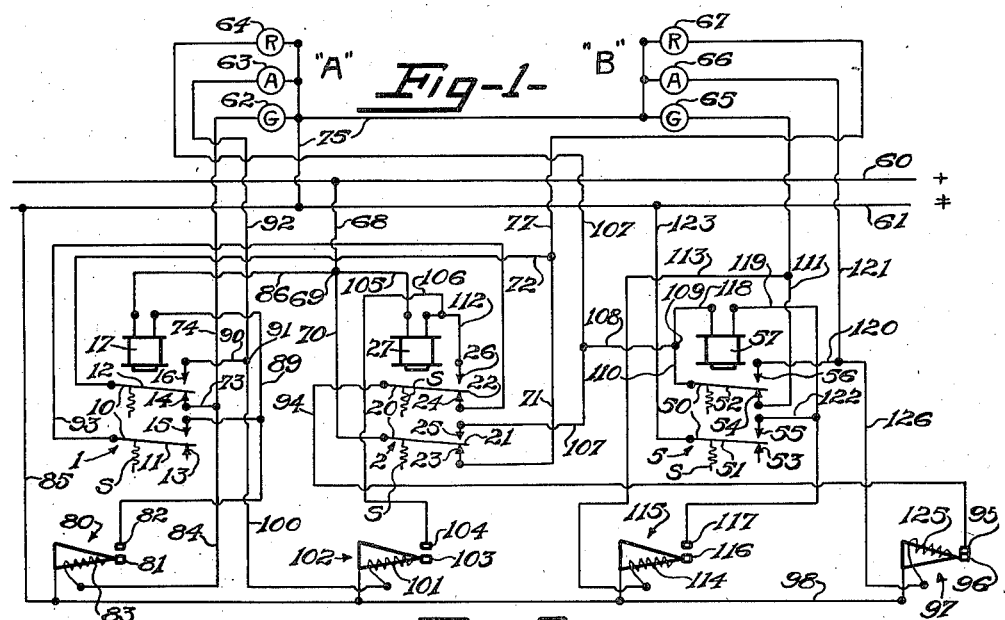
Fig-1-
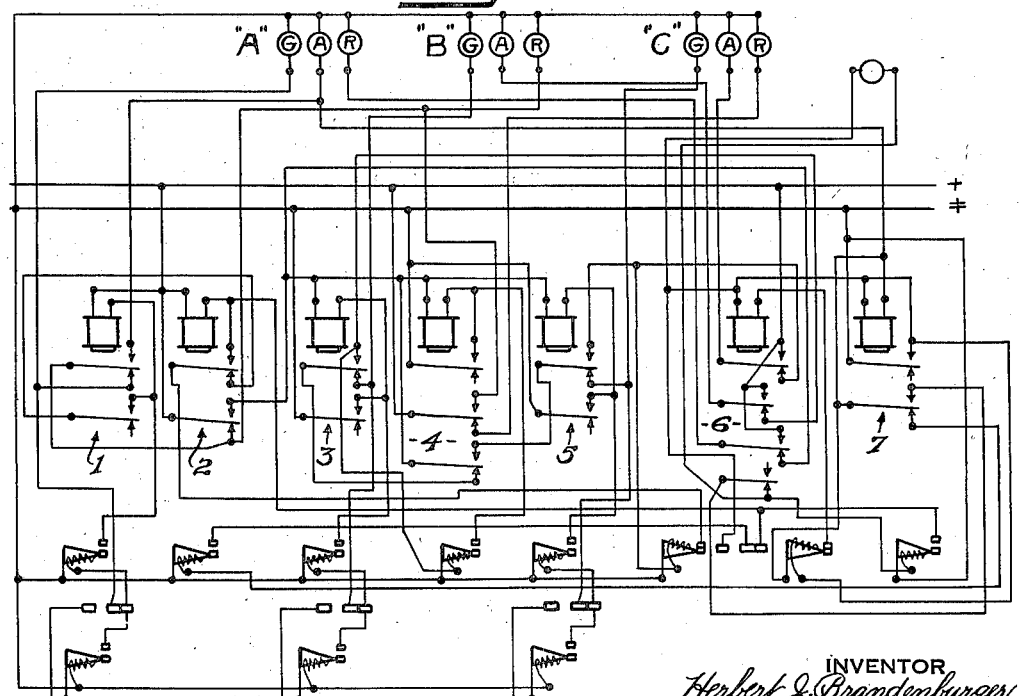
Fig-2-
INVENTOR
Herbert J. Brandenburger
BY
Bodell & Thompson
ATTORNEYS

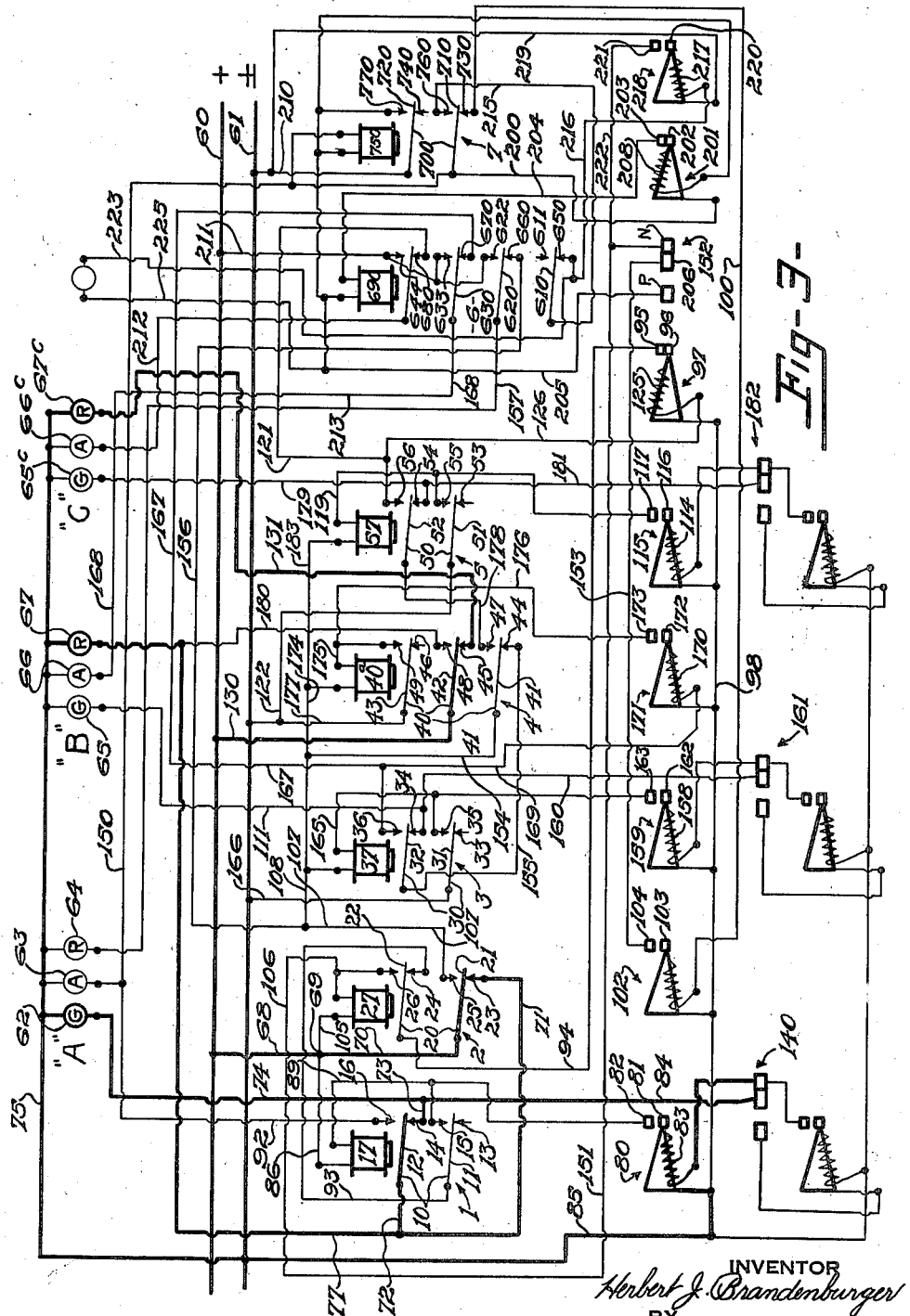

March 16, 1937. H. J. BRANDENBURGER 2,073,828
CYCLE TIMER
Filed Dec. 24, 1931 10 Sheets-Sheet 3
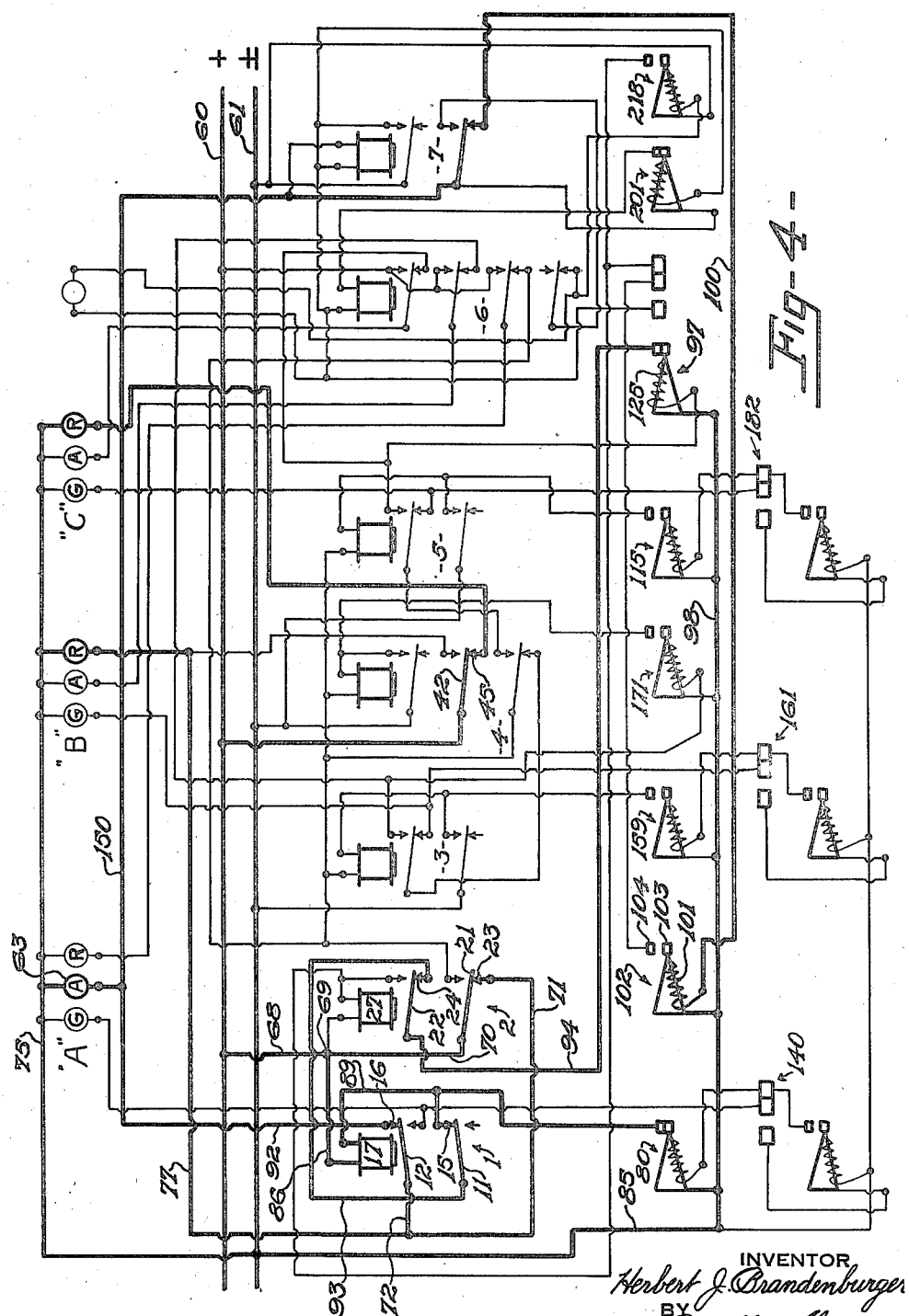
Fig-4-
INVENTOR
Herbert J. Brandenburger
BY
Bodell & Thompson
ATTORNEYS

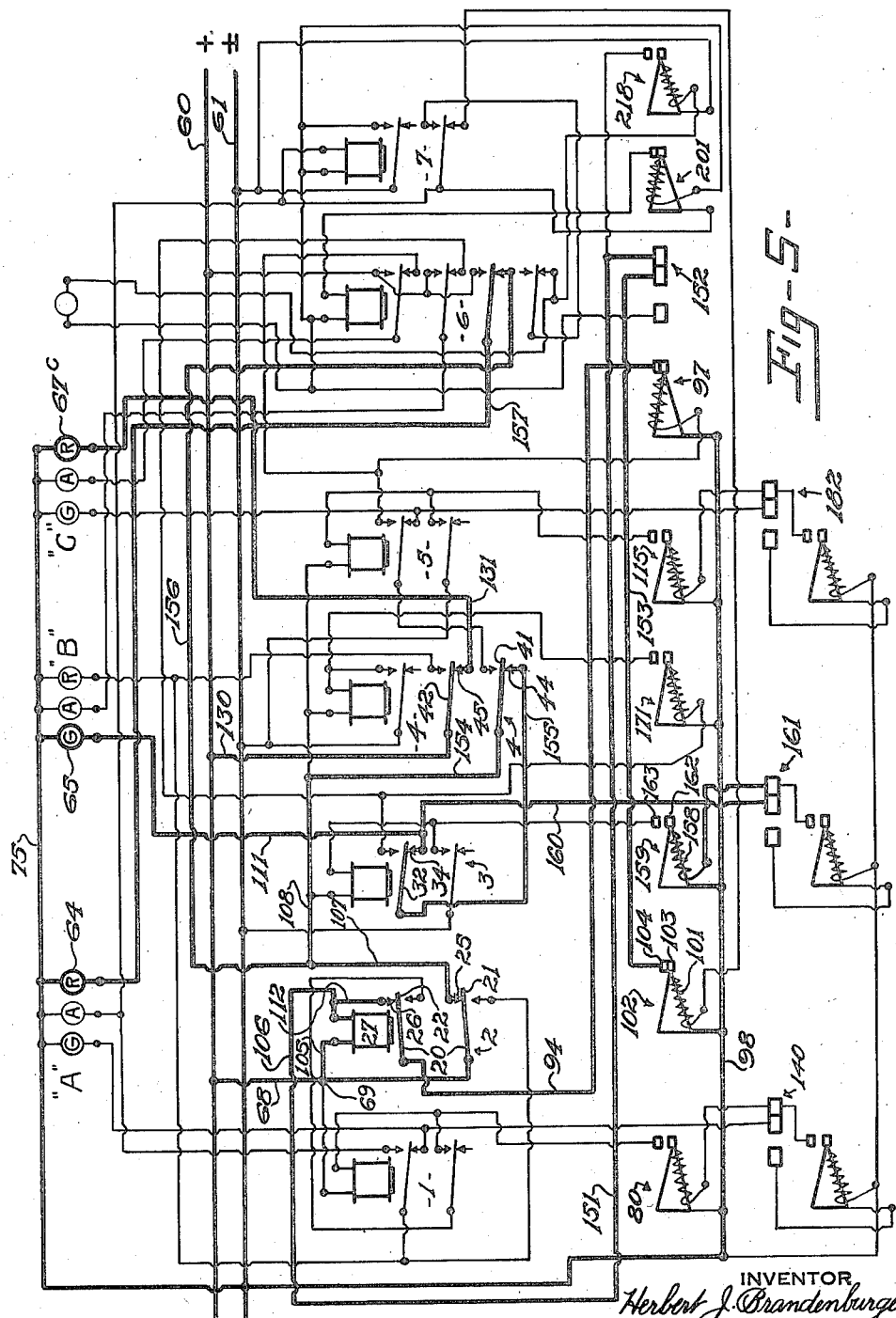

March 16, 1937. H. J. BRANDENBURGER 2,073,828
CYCLE TIMER
Filed Dec. 24, 1931 10 Sheets-Sheet 5
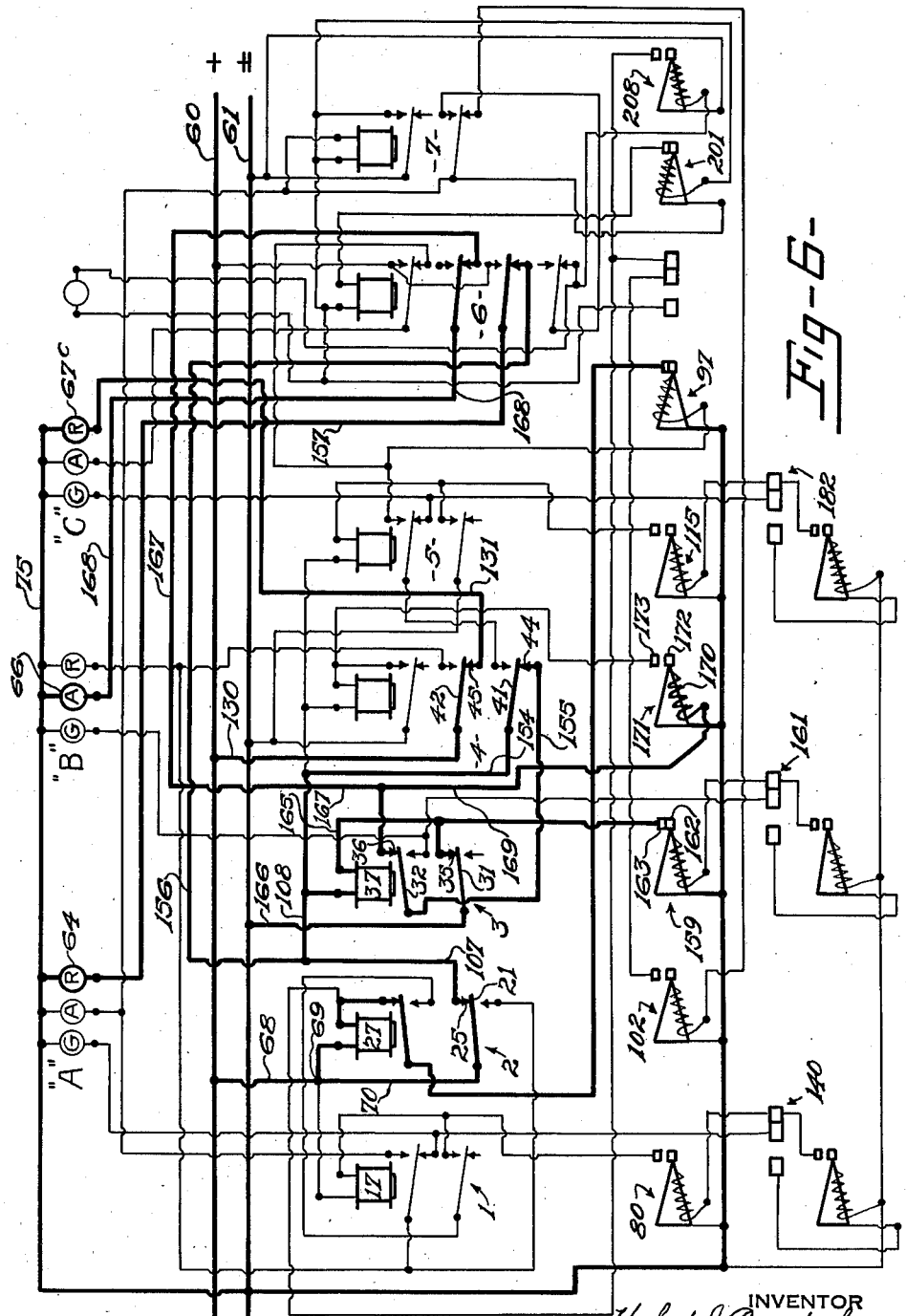
Fig-6-
INVENTOR
Herbert J. Brandenburger
BY
Bodell & Thompson
ATTORNEYS

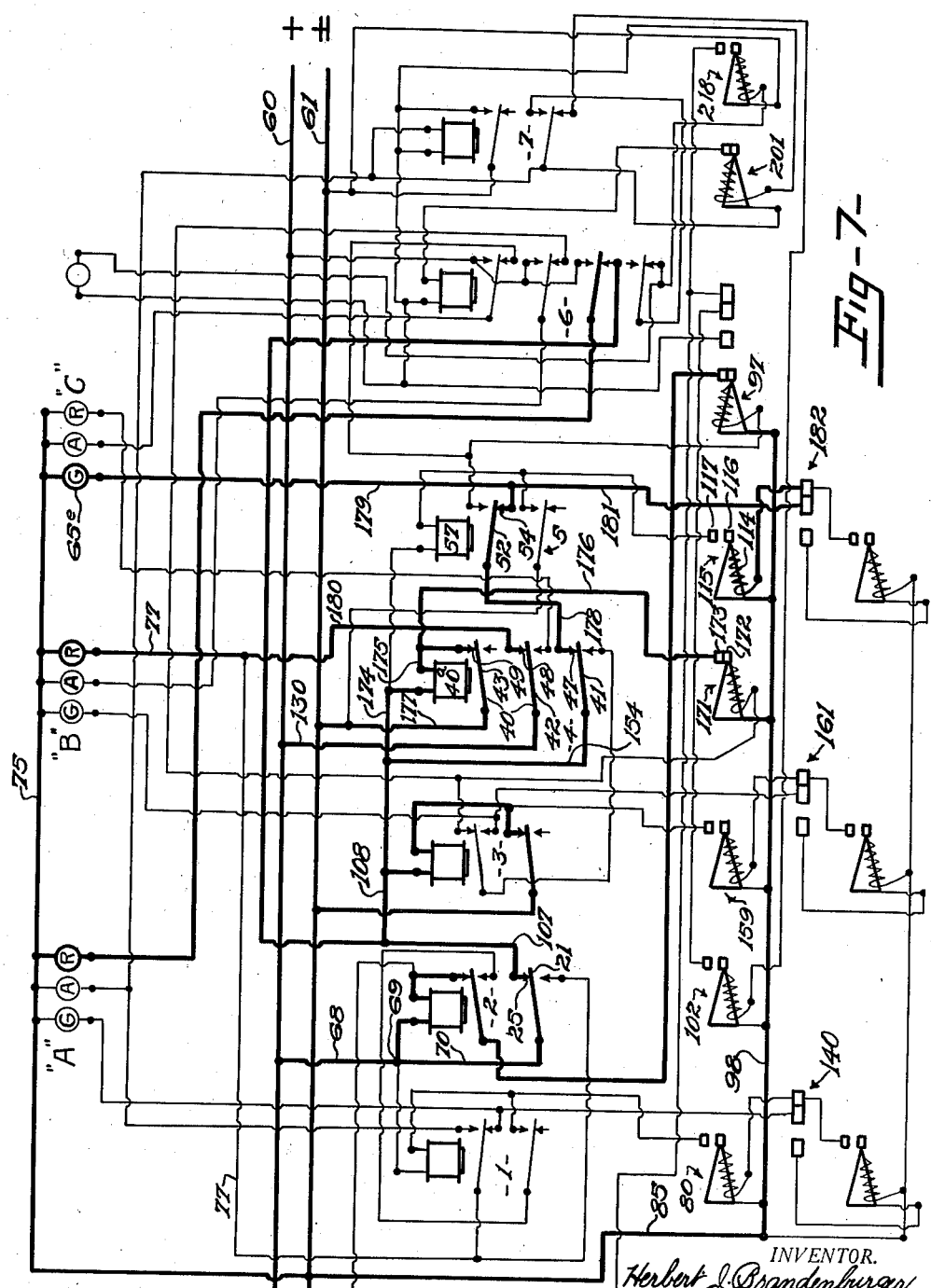

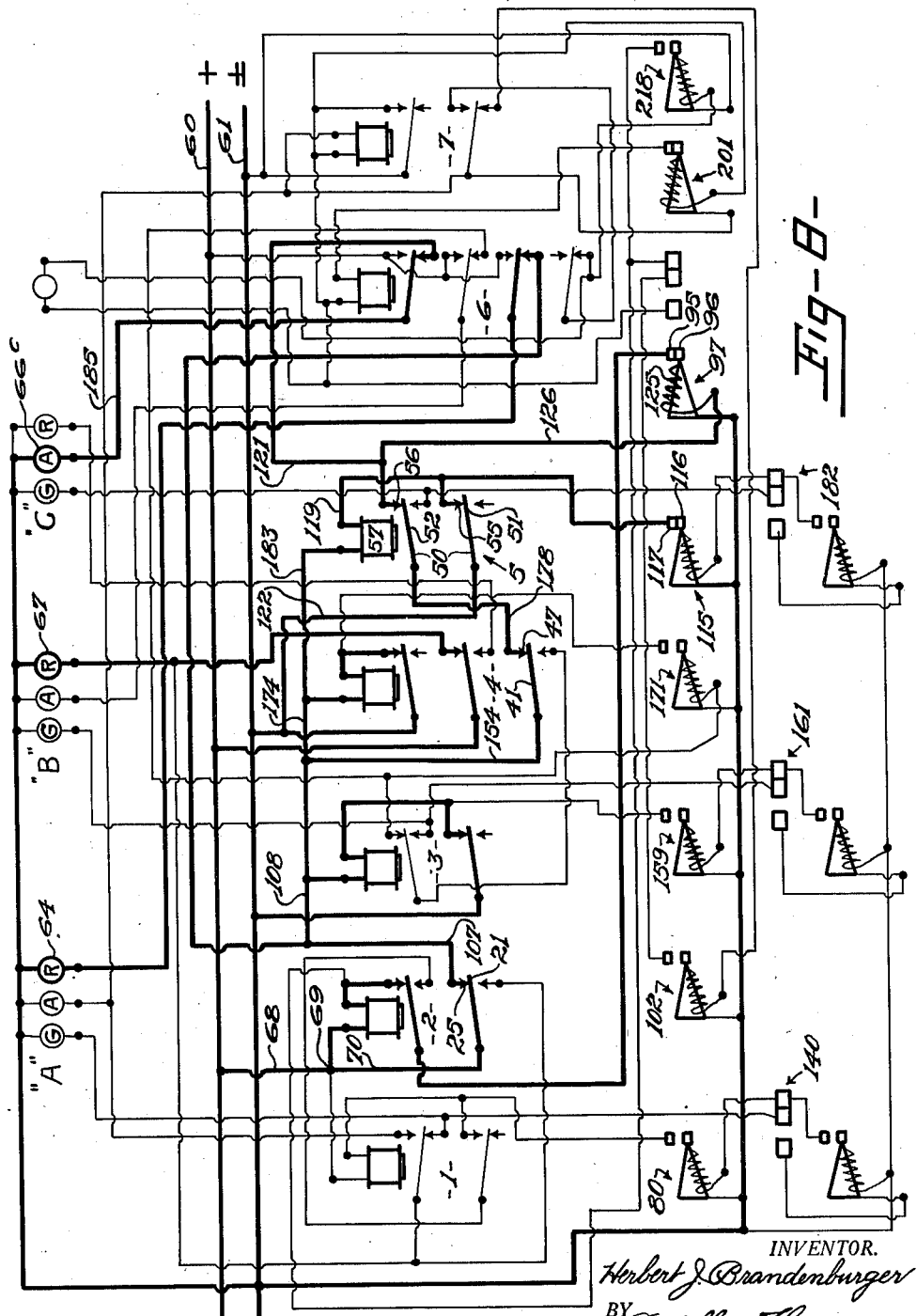

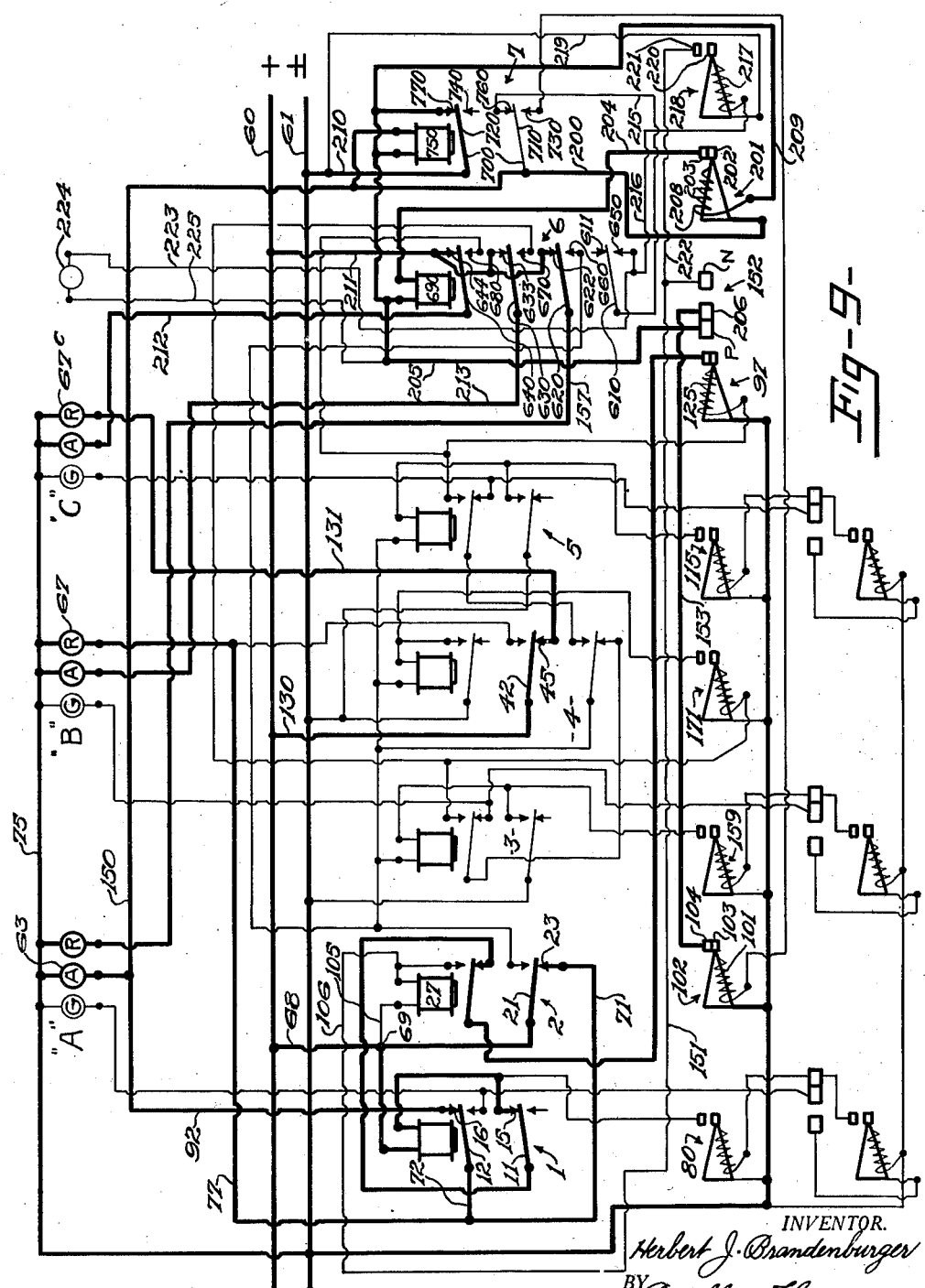

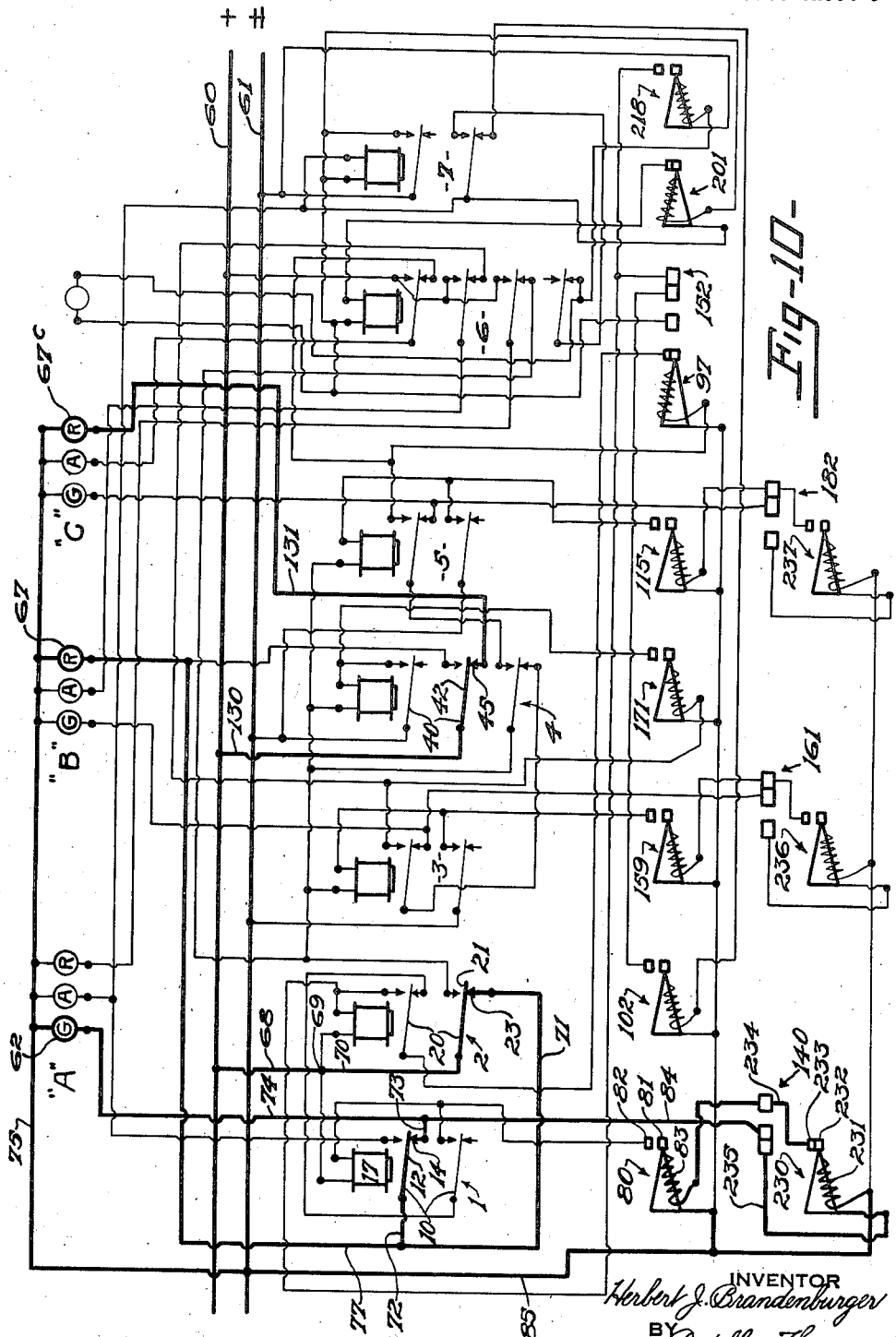

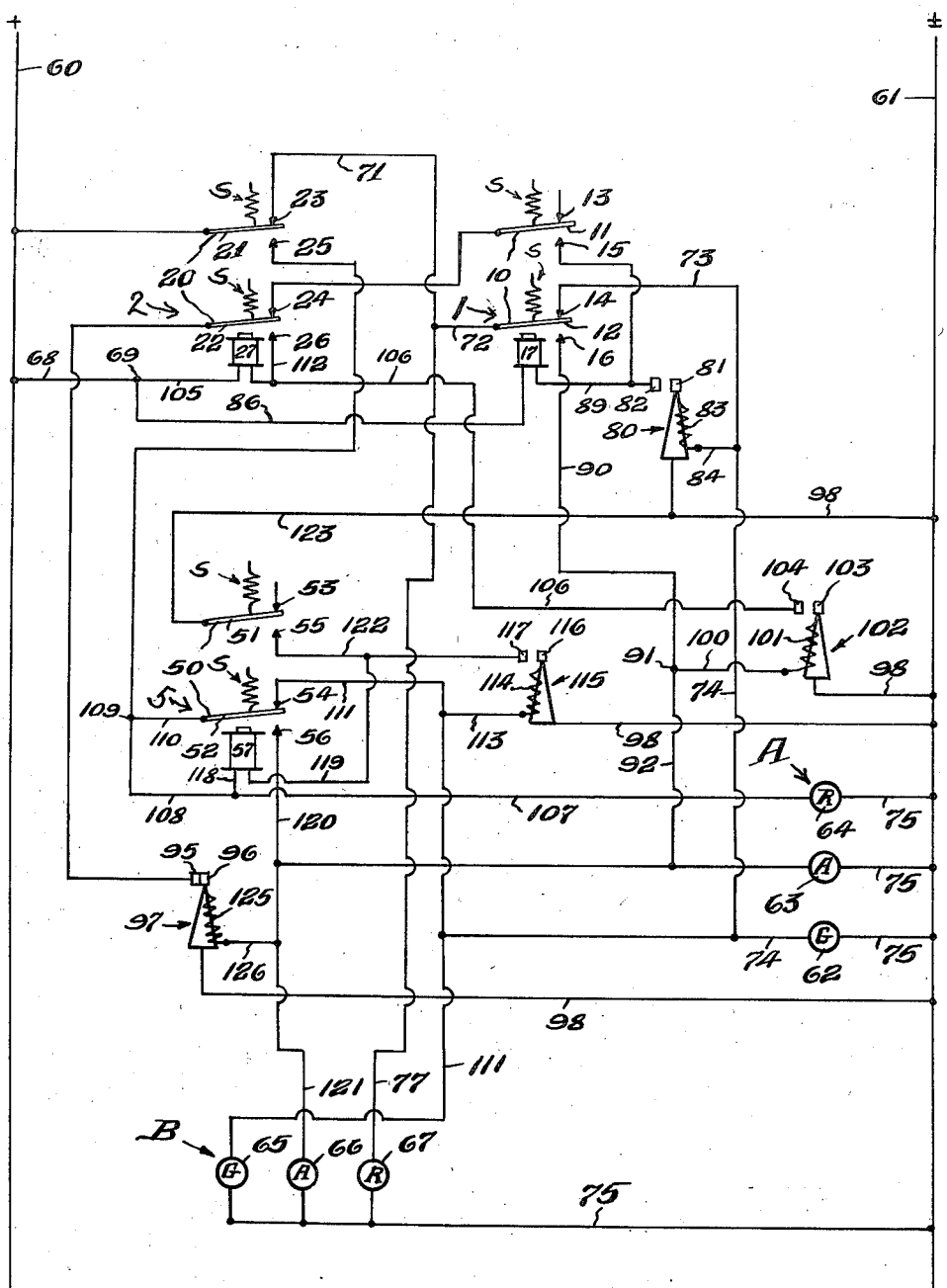

Patented Mar. 16, 1937

2,073,828

UNITED STATES PATENT OFFICE 2,073,828

CYCLE TIMER

Herbert J. Brandenburger, St. Louis, Mo., assignor to Crouse-Hinds Company, Syracuse, N. Y., a corporation of New York Application December 24, 1931, Serial No. 583,033

6 Claims. (Cl. 177—337)

This invention relates to work cycle timers which control the opening and closing of work circuits in a predetermined time and order, and has for its object, an electrically operated cycle timer in which the component parts are simple and economical electrical elements, duplicates of which can be added to a timer of any given capacity to increase the capacity, and in which there are no motor or time actuated shafts, wheels, cams, and the like, or a timer which is particularly simple, economical, and compact in construction, and capable of being adapted to any given situation by merely adding duplicate parts to the simpler form of the timer.

The cycle timer is here illustrated as adapted to controlling the display of street traffic signals by opening and closing electric circuits which control the timing and the display of signals in a predetermined order.

The invention consists in the novel features and in the combinations and constructions hereinafter set forth and claimed.

In describing this invention, reference is had to the accompanying drawings in which like characters designate corresponding parts in all the views.

Figure 1 is a diagrammatic view of this timer in its simpler form.

Figure 2 is a diagrammatic view of this timer showing the same when adapted to a three street intersection.

Figure 3 is a view, similar to Figure 2, showing the first period of the cycle when green is displayed on A street, and red, or stop, on B and C streets, the live circuits being indicated by heavy lines.

Figure 4 is a view, similar to Figure 3, showing the second period of the cycle when a warning, or amber, signal is displayed on A street, and the red, or stop, signals persist on B and C streets, the live circuits being indicated by heavy lines.

Figure 5 is a view, similar to Figure 3, showing the third period of the working cycle when red is displayed on A street, green on B street, and red persists on C street, the live circuits being indicated by heavy lines.

Figure 6 is a view, similar to Figure 3, showing the position of the parts during the fourth period when amber is displayed following the green on B street, and red persists on A and C streets, the live circuits being indicated by heavy lines.

Figure 7 is a view, similar to Figure 3, showing the position of the parts during the fifth period of the cycle when red persists on A street, is displayed on B street, and green is displayed on C street, the live circuits being indicated by heavy lines.

Figure 8 is a view, similar to Figure 3, showing the positions of the parts when amber is displayed on C street, and red persists on A and B streets, the live circuits being indicated by heavy lines.

Figure 9 is a diagrammatic view, similar to Figure 4, showing the position of the parts when red is displayed on all three streets, and amber coincidentally displayed on all three streets to give a pedestrian period, or any other odd period, wherein all vehicular traffic is stopped, the live circuits being indicated by heavy lines.

Figure 10 is a view, similar to Figure 3, showing the position of the parts when one of the traffic cycle periods, as the first period with the go signal on a main street, is prolonged during rush hours, and the stop periods on the cross streets are correspondingly prolonged, the live circuits being indicated by heavy lines.

Figure 11 is an across-the-line diagram of the form shown in Figure 1.

This cycle timer includes a series of successively operable double throw switches or relays for controlling the work circuits, as signal circuits, to be timed, the switches being normally arranged in starting position and returnable to said position by suitable means as a spring or weight, means as electromagnets, one for each switch for throwing the switches into their second position, and electrically operated timed means, as the heating coils of open thermal switches, in the starting circuits of the magnets, one for each relay or its magnet, for controlling the throwing of the relays successively, each heating coil circuit being connected in the feed circuit through the preceding relay switch when in its second position, with the exception of the heating coil of the first relay, where its timing coil is connected through the first and second relay switches when in starting position, and timed means, as the heating coils of a normally closed thermal switch in a stick circuit common to all the magnets, the last heating coil being connected in the feed circuit through the last relay of the series when in second position, so that when the thermal switch in the stick circuit is opened all the relays return to starting position and the cycle repeats.

The stick circuit of the first relay is connected in the feed circuit through one of the other relays, as the second, when the second is in starting position. Hence, when the second relay is thrown to its second position, the first relay is returned to starting position during the rest of the cycle.

The second relay also remains in second position during the remainder of the cycle, and controls the throwing of the third etc., relays, which also remain in second position to the end of the cycle. Hence, as the second relay controls the other relays, it is a master relay.

In Figure 1, this timer is shown diagrammatically in its simpler form as controlling the signals of a two street intersection where the go, or green, signals are displayed on one street, while the red signals are displayed on the other street, and thereafter, a warning, or amber, signal follows the green signal, while the red persists and then, the green is displayed on the second street while red is displayed on the first street, and the warning signal follows the green on the second street while the red persists on the first street and thereafter, green is again displayed on the first street, and red on the second, and the cycle is repeated as long as the system is in operation.

In Figure 1, is shown a series of three double throw switches, each having means, as a spring or weight, for initially throwing the switch to its starting position, and electro-magnets, one for each double throw switch, for throwing the same into second position against the action of its returning means, a starting circuit for each electro-magnet having a wire connected in the feed circuit through the companion double throw switch when in its starting position, stick circuits for the electro-magnets, each having a conductor connected in the feed circuit through the companion double throw switch when in its second position, a normally open switch in each starting circuit, electrically operated timer means, as heating coils, acting on each of the latter switches to close the same, circuits for the timer means or heating coils respectively, the electrically operated timer means controlling the starting circuit of the second and each succeeding electromagnet, that is, the third electro-magnet, having circuits connected in the feed circuit through the preceding double throw switch when the latter is in its second position and the companion double throw switch is in its first position, the heating coils being arranged to act on each of the switches to close the same, a normally closed switch in the stick circuits and common to all of them, and having its heating coil arranged when energized to heat the same to operate the normally closed stick circuit switch to open it after a predetermined interval, this heating coil having its circuit connected in the feed circuit through the last of the double throw switches when the same is in its second position, so that the second and succeeding double throw switches remain in their second position to the end of the cycle, and the operation of the third is controlled by the second being in its second position, and the operation of the second is controlled by the first switch being in its second position.

In Figure 1, the numerals 1, 2, and 5, designate the double throw switches of the series, the switch 2 being the main, or master switch. The reference numerals 3, 4, are reserved for other switches shown in Figure 2, which are used when the timer is adapted for a cycle having more periods, as for operating the signals of a three street intersection.

The double throw switches may be of any suitable form, size and construction, and are substantially alike in construction. Because different reference numerals are required for each of them, they will be described separately in order that the circuits may be more readily traced.

The master relay switch 2 comprises an oppositely shiftable switch member 20 having two terminals 21 and 22 normally engaged with contacts 23 and 24 of one row, and shiftable into engagement with contacts 25 and 26 of an opposite row. The switch member 20 is normally held in its initial or starting position in which its terminals 21 and 22 are engaged with contacts 23 and 24 by suitable means, as coiled spring S. The movable switch member is thrown against the action of its spring S to carry its terminals 21 and 22 into engagement with the contacts 25 and 26, by an electro-magnet 27.

The relay switch 1 includes a movable switch arm 10 having terminals 11 and 12 which coact with contacts 13 and 14 of one row, and 15 and 16 of an opposite row. A spring S normally holds the switch member or arm 10 with the terminals 11 and 12 engaged with the contacts 13 and 14 and the switch member 10 is operated against the action of the spring to carry its terminals 11, 12 into engagement with the terminals 15, 16 by an electro-magnet 17. The terminal 13 is a dead or idle one and is not connected in any circuit.

The double throw switch 5 includes a movable switch arm or member 50 having terminals 51, 52 which are normally engaged with one row of contacts 53, 54, the member 50 being shiftable to engage the terminals 51, 52 with the contacts 55, 56 of an opposite row. The switch arm 50 is held in its starting position with the terminals thereof engaged with the contacts 53, 54 by the spring S and is thrown against the action of the spring to engage the terminals 51, 52 with the contacts 55, 56 by an electro-magnet 57. The contact 53 of this double throw switch is also a dead or idle one.

60 and 61 designate the wires of a feed circuit. 62, 63, and 64 designate respectively the go, warning, and stop, signals displayed on one street, as A street, and 65, 66, and 67, the go, warning, and stop, signals displayed on the intersecting street, as B street. These signals are connected in work circuits which are connected in the feed circuit through the switches 1, 2, and 5, as will be presently described. The relay switch 1 controls the display of the go or green signal 62, and the amber signal 63 on street A through the master relay 2, when the master relay is in its starting position with the terminals 21, 22, engaged with the contacts 23, 24. The display of the stop signal 67 on the intersecting street B is controlled by the master relay 2 when in its starting position while the display of the go signal 65 on the intersecting street, that is B street, is controlled by the relay 5 when in its normal position through the relay 2 when in its second position with its terminals 21 and 22 engaged with the second row of contacts 25 and 26. The warning signal 66 following the go signal on the B street is controlled by the relay 5 when in its second position wherein its terminals 51, 52 are engaged with the contacts 55, 56. Initially all the relay switch arms 10, 20, and 50, are thrown by the springs S so that their terminals are engaged with the first or lower row of contacts, and the go signal 62 is displayed on A street while the red signal is displayed on B street. The circuit from the feed line is as follows: From the feed wire 60, through the wire 68, to junction 69, wire 70, to terminal 21 of the switch arm 20 of relay 2, contact 23, wires 71, 72, to terminal 12 of the switch arm 10 of relay 1, contact 14, wire 73, thence through wire 74 to go signal 62 and through return wire 75 to the other feed wire 61.

The stop signal circuit 67 of the intersecting street B is also established through terminal 21 and contact 23 of the master double throw or relay switch 2, and thence through wires 71, 77, to the red signal 67, thence through return wire 75 which is connected to the other feed wire 61. Thus, as long as the master double throw or relay switch 2 is in its starting position, the stop signal will persist on the intersecting street B and also the green signal will persist as long as the master relay 2 is in its starting position and also the relay 1 is in its starting position. As in the work or signal circuits here shown, the amber or warning signal follows the green, and not the red, the red signal must persist after the green has discontinued and while the amber or warning signal is presented.

The warning or amber signal 63 is presented on the first street A by the throwing of the relay 1 by the electro-magnet 17. The starting circuit for energizing the electro-magnet 17 is through the master relay 2 when in its starting position and also, through the relay 1 when in its starting position, and this starting circuit has a normally open timed switch therein which, when closed, closes the starting circuit.

The means for timing the switch is a heating coil, or in other words, the switch is a normally open thermal switch.

80 designates the thermal switch, which may be of any suitable form, size, and construction, this switch having a terminal 81, normally separated from a contact 82.

83 designates the heating coil acting on the switch 80 to flex it when the coil is energized and cause the terminal 81 to engage the contact 82.

The starting circuit is as follows: from wire 60, through wire 68, junction 69, wire 70, to terminal 21 of master switch 2, contact 23, wires 71, 72, terminal 12 of relay 1, contact 14, wire 73, wire 84, through heating coil 83, thence through the frame of the switch 80 and return wire 85, to the feed line 61. When the heating coil heats sufficiently to warp or flex the switch 80 to cause the terminal 81 to engage the contact 82, the current initially flows through the electro-magnet 17 as follows: From feed line 60, through wire 68, to junction 69, wire 86 through the coil 17 and thence, through wire 89 to contact 82 thence, through terminal 81 and the frame of the thermal switch 80, to the return wire 85. When the magnet 17 is thus energized, it throws the switch arm 10 against the action of its springs to engage the terminals 11 and 12 of the relay 1 with the contacts 15 and 16, thus breaking the circuit through the go signal 61 on the street A and heating coil 83 of switch 80, and closing the circuit through the amber or warning signal 63 on the main street, the amber circuit being as follows: From feed line 60, through contacts 21 and 23 of relay 2, as before, which relay 2 remains in its starting position, thence through wires 71, 72, to terminal 12 of relay 1, through contact 16 and wire 90 to junction 91 thence through wire 92 to the amber signal 63 and return wire 75. Thus, the extent of time that the green signal is displayed is controlled by the heating element 83, or the time required for said element to heat the switch 80 to flex it sufficiently to cause the terminal 81 to engage the contact 82.

The stick circuit for the electro-magnet 17 is established through the master relay 2 when in its starting position and the relay 1 when in its thrown position.

This stick circuit is as follows: From the feed line 60, through wires 68, 86, coil 17, wire 89, contact 15 and terminal 11 of relay 1, through wire 93 to contact 24 of the master relay 2 which is engaged with terminal 22 thence, through wire 94 to a contact 95, which is normally engaged with the terminal 96 of a normally closed timing or thermal switch 97 to be presently described, thence through the frame of said switch 97, to wire 98, thence through return wire 85 to the feed wire 61.

At the same time the current passes from the junction 91, through wire 100, and a heating coil 101 of a normally open thermal switch 102, and from the heating coil through the frame of the switch 102 to the return wires 98, 85. Thus, the amber light on A street will persist as long as the terminal 103 of switch 102 is separated from the contact 104. The switch 102 thus controls the extent of time that the amber light 63 is displayed on street A before the change occurs to green on B street and red on A street. The starting circuit for the magnet 27 for the master relay has the normally open switch 102 therein, which is closed by the action of the heating coil 101 and when the switch 102 is closed, the starting circuit is as follows: From feed wire 60, wires 68, junction 69, wire 105, through electro-magnet 27 thence through wire 106, through the contact 104, terminal 103 and frame of switch 102 to the return wire 85. When this circuit is established and the electro-magnet 27 energized, the master relay switch arm 20 is thrown from its starting position into its second position, where the terminals 21 and 22 are engaged with the contacts 25 and 26, thus breaking the circuit to the relay 1 and also the circuit to the heating coil 101 by the separating of the terminal 21 from the contact 23 so that relay switch 1 returns to its normal position and is dead, and also the circuit to the red or stop signal 67 on B street is opened by reason of the separation of the terminal 21 from the terminal 23 of the master relay 2. Also, at the same time, the circuit through the red or stop signal 64 on A street is closed and the circuit through the go signal 65 on B street is closed.

The circuit to the red or stop signal 64 on A street is as follows: From feed wire 60, wire 68, wire 70, terminal 21 of the master relay 2, contact 25, wire 107, to the stop signal 64 on A street thence, to return wire 75, to feed wire 61.

The circuit for green or go signal 65 of B street is as follows: From the feed line 60, through wire 68, to the terminal 21, and contact 25 of the master relay 2 as before, then through wires 107, 108 to junction 109 thence through wire 110, to terminal 52 of relay switch 5, which is in starting position, or in engagement with the contact 54, thence through wire 111 to the signal 65 of street B and thence, through return wire 75, to feed wire 61. A stick relay circuit for the magnet 27 is established from feed wire 60, through wires 68, junction 69, wire 105, magnet 27, wire 112, to contact 26 of the master relay 2, to terminal 22 and wire 94 and the frame of thermal switch 97, to return wires 98 and 85. This stick relay circuit remains closed until the end of the cycle.

Also, at the same time that the current is passing through wires 108, 110, and the contacts 52 and 54 of relay switch 5, to the go signal 65 on street B through wire 111, the current is passing from wire 111, through wire 113, to the heating or timing coils 114 of the normally open thermal switch 115 in the starting circuit for the electro-magnet 57 of relay 5, and when the coils 114 heat the switch 115 sufficiently to warp it to cause its terminal 116 to engage contact 117, the circuit for initially energizing the magnet 57 is established, the current passing from wire 108, and junction 109, through wire 118, through the electro-magnet 57 thence, through wire 119, to the contact 117. As contact 117 is now engaged with terminal 116, the current passes through the frame of switch 115, to return wires 98, 85.

The magnet 57 thus being energized throws the arm 50 of relay switch 5 from its starting position carrying its terminals 51, 52, into engagement with the contacts 55, 56, thus separating the terminal 52 from the contact 54 so that the circuit through the green or go signal 65 on B street is broken and also the circuit to the heating coil 114 is broken, and a circuit is established between the terminal 52 and the terminal 56 of relay 5, so that the circuit through the amber or warning signal 66 of B street is established from the feed line 60, through wire 68, terminal 21, and contact 25 of the master relay 2, wires 107, 108, 110, terminal 62, contact 56, wires 120, 121, through the warning signal 66 to return wire 75. At the same time, the stick circuit for the magnet 57 is established from the feed line, through wire 108, to junction 109, wire 118, magnet 57, wires 119 and 122, contact 55 and terminal 51 of relay switch 5 and thence, through wire 123 to feed wire 61. Also, at the same time that the circuit is closed through the warning signal 66 by the engagement of the terminal 52 with contact 56 of relay 5, a circuit is established through the heating coils 125 of the normally closed switch 97 as follows: From wire 120, through wire 126 and heating coils 125, and thence through the frame of the normally closed switch 97 in the stick circuit of the master relay 2, to return wire 98. When coil 125 heats sufficiently to separate the terminal 96 from the contact 95, all the stick circuits are broken and the master relay 2 and relay 5 are returned to their starting position by the springs S. Also, the current through the heating coil 125 is broken by the breaking of contacts 52 and 56 of relay 5. Relay 1 returns to its starting position immediately when relay 2 is thrown by its electro-magnet 27 from its starting position to its second position, and the cycle repeats as long as the feed lines 60, 61, are closed.

In Figure 2 is shown diagrammatically a cycle timer for controlling a system having more periods in the cycle, and as specifically adapted for a three street intersection, and also as including a pedestrian period in which all stop signals are set against the vehicular traffic and all warning signals set to notify pedestrians that they are free to cross the intersection. Also, is shown diagrammatically means by which any one or more signals may be prolonged without varying the other signals. As for instance, at certain hours of the day it may be desirable to increase the length of time of the go signal on the main street and correspondingly increase the stop signals on the intersecting streets, but not increase the go signals on the intersecting streets, or the stop signals on the main street, and not increase the warning signals.

A, B, and C, designate the three intersecting streets. In the system shown in Figure 2, when green is displayed on A street, red is displayed on B and C streets, and when the amber or warning signal is displayed on A street following the green signal, the red signals persist on B and C streets. After the amber signal on A street is displayed, a pedestrian period intervenes in which all the amber signals and all the red signals are set. At the end of the pedestrian period, the amber is repeated on A street, the red light being displayed on B and C streets. After this second display of amber on A street, the green signal is displayed on B street with red signals displayed on A and C streets. Then amber is displayed following green on B street and then, green is displayed on C street, while red is displayed on both A and B streets. After the amber signal on C street, the cycle starts over again with the display of green on A street with red on B and C streets.

The extension of the timer for a three street intersection requires two additional double throw switches 3, 4, and the inclusion of the pedestrian period requires two more double throw switches 6, 7.

These double throw switches 3, 4, are the same respectively as the double throw switch 1, 2, or 5, except that switch 4 is a three pole switch. Both switches 3 and 4 are also controlled by the master switch 2.

In the three street system shown, the pedestrian or all amber period occurs occurs once during each cycle. The operation of the pedestrian period may be cut in or out, as desired, by means of a suitable switch. The operation of the cycle timer for the three street intersection without the pedestrian period will first be described.

As shown in Figure 3, the double throw switch 3 includes a switch member 30 having terminals 31 and 32 normally engaged with contacts 33, 34, and shiftable into engagement with contacts 35, 36, by the electro-magnet 37. The three pole double throw switch 4 comprises a switch arm 40 having three terminals 41, 42, 43, normally engaged with contacts 44, 45, 46, and shiftable into engagement respectively with contacts 47, 48, 49, by electro-magnet 40a.

Normally starting with the green signal 62 displayed on A street with the red signals 67 and 67c on B and C streets, (Fig. 3), the circuits are as follows: From wire 60, through wire 68, junction 69 and wire 70, to terminal 21 and contact 23 of the master switch 2, through wires 71, 72, to terminal 12 of double throw switch 1, thence through terminal 14 and wires 73, 74, to the green signal 62 thence through the return wire 75, to the other side 61 of the feed line. The circuit for the red signals on B street is from feed wire 60 to terminal 21 and contact 23 of the master switch 2 as before and thence, through wires 71, 77, to the red signal 67, thence through return wire 75 to the other feed wire 61. These circuits are the same as in Figure 1.

The red circuit on C street is from feed wire 60, through wire 130, to terminal 42 of the double throw switch 4, then to terminal 45, wire 131, to the red signal, thence through the return wire 75, to the other side 61 of the feed line. At the same time, the current is passing from the terminal 14 of the double throw switch 1, through the wire 84 and the heating element 83 of the thermal switch 80, the wire 84 having a closed switch 140 therein which need not be now considered. This switch 140 is primarily to cut in or out of the system, the time extension feature to be hereinafter described. With the exception of the switch 140, this circuit is the same as in Figure 1.

The green remains displayed as long as the thermal switch 80 is open, or during the time it takes the heating coil 83 to heat the switch 80 sufficiently to bring its terminal 81 into engagement with the contact 82 closing the starting circuit for the electro-magnet 17. When the electro-magnet 17 is initially energized, as set forth in connection with Figure 1, the switch arm 10 of the double throw switch 1 is thrown so that the terminals 11, 12, are engaged with the contacts 15, 16, and the circuit through the wire 74 to the green signals on A street, and the circuit through the wire 84 to heater 83, are broken, and the circuit through the wire 92 to the amber light on A street is closed, the other circuits remaining intact. The amber circuit for A street, as before described and as seen in Figure 4, is from the feed line 60, wire 68, junction 69, wire 70, terminal 21, and contact 23 of the master relay 2, thence through the wires 71, 72, through the terminal 12 and contact 16 of the double throw switch 1, thence, through wire 92 to the amber signal 63 of A street, thence through return wire 75, back to the feed line 61. At the same time, Figure 4, the stick circuit for the electro-magnet 17 is established, as in Figure 1, through wires 68 and 86, coil 17, wire 89, contact 15, and terminal 11 of double throw switch 1, wire 93, to contact 24 and terminal 22, relay 2, and wire 94, through the frame of the normally closed switch 97 in the stick circuit to the return wires 98 and 85.

While the amber signal 63 on A street is displayed, the current also passes from the wire 92, to the amber light 63 street A, through wire 150, through terminals and contacts of the relay 7 and thence through wires 100 to the heating coil 101 of the thermal switch 102. The double throw switch 7 need not at this time be considered as it is merely coupled in for the pedestrian period feature which will be described later in connection with that feature.

The time required for the heating coil 101 to warp the switch 102 sufficiently to cause its terminal 103 to engage the contact 104 determines the time extent of the amber period on A street. When the terminal 103 does engage the contact 104, the starting circuit of the electro-magnet 27 for the master relay 2 is closed, as seen in Figure 5, whereupon the switch arm 20 is thrown to carry the terminals 21, 22, into engagement with the contacts 25 and 26, so that the double throw switch 1 is free to be returned to starting position, but is entirely cut out of the circuit, due to the fact that the terminal 21 of the master relay 2 is separated from the contact 23 and the double throw switch 1 is cut out of all circuits during the remainder of the cycle. Its stick circuit is broken by the throwing of the master switch 2. When the terminal 103 of the thermal switch 102 does engage the contact 104, the starting circuit through the electro-magnet 27 is as follows: From the feed wire 60, wire 68, junction 69, wire 105, electro-magnet 27, wire 106, wire 151, (Figure 5) through a switch 152, through wire 153, contact 104, terminal 103, and the frame of the switch 102, to the return wire 98.

The switch 152 is for the purpose of cutting in or out of the system, the switches 6, 7, which control the pedestrian period, and during this operation it is assumed to be in its position in which it cuts out the pedestrian period. The stick circuit for the electro-magnet 27 is, as before, from the feed wire 60, wire 68, junction 69 and wire 105, electro-magnet 27, wire 112, contact 26, and terminal 22 of the master switch 2, thence through wire 94 to the frame of the normally closed switch 97 in the stick circuit thence, through return wire 98. The green signal 65 is displayed on B street while the red signals 64 and 67c are displayed on A and C streets respectively.

The circuit for the green signal on B street is as follows: (Figure 5) Feed lines 60, wire 68, junction 69, wire 70, terminal 21 and contact 25 of the master relay 2, wires 107, 108, and 154, to terminal 41 of double throw switch 4, contact 44, wire 155, to terminal 32, and contact 34 of double throw switch 3, thence through wire 111 to the green signal 65 on B street, thence through return wire 75.

The circuit for the red signal on A street is from feed line 60, through wire 68, junction 69, wire 70, terminal 21, and contact 25 of the master relay 2, thence through wires 107 and 156, through normally engaged contact and terminal of the pedestrian double throw switch 6, thence through wire 157, to the red signal 64 of A street and through return wire 75.

The circuit for the red signal 67c on C street is as follows: From feed line 60, wire 130, through terminal 42 and contact 45 of the double throw switch 4, wire 131, to the red signal 67c and through return wire 75.

While the green signal on B street is displayed, the heating coil 158 of the thermal switch 159 paired with the double throw switch 3 is being heated. The circuit is as follows: (Figure 5) From wire 60, through wire 68, junction 69, wire 70, terminal 21 and contact 25 of the master double throw switch 2, wires 107, 108, wire 154, thence through the engaged terminal 41 and contact 44 of the double throw switch 4, wire 155, to engaged terminal 32 and contact 34 of the double throw switch 3 thence through wire 160, through switch 161, which need not be considered, corresponding to switch 140, thence through wire 161, through the heating coil 158, and the frame of switch 150, to return wire 98.

As the heating coil 158 heats and causes the terminal 162 of the switch 159 to engage the contact 163, the current passes, as seen in Figure 6, through the starting circuit of the magnet 37 of the double throw switch 3 as follows: Feed line 60, wire 68, junction 69, wire 70, terminal 21 and contact 25 of the master double throw switch 2, thence through wires 107, 108, electro-magnet 37, wire 165, thence through the engaged contact 163 and terminal 162 and through the frame of the switch 159 to the return wire 98, thus throwing the double throw switch 3 into the position shown in Figure 6 in which the green signal 65 on B street and the heating coil 158 of thermal switch 159 are both deenergized. The stick circuit is from the line wire 60, through the electro-magnet 37, as just described, and thence through the engaged contact 35 and terminal 31 of the double throw switch 3 and then through wire 166, to the other feed wire 61.

The red signal 64 on A street, and the red signal 67c on C street, and the amber signal 66 on B street are now showing.

The red circuit on A street is as follows: Feed line 60, wire 68, junction 69, wire 70, terminal 21, and contact 25 of the master relay 2, wire 107, wire 156, through the engaged contact and terminal of the four pole pedestrian switch 6, wire 157 to the red signal 64 on A street thence through return wire 75. The circuit for the red signal 67c on C street is the same as before, that is, feed line 60, wire 130, engaged terminal 42 and contact 45 of the double throw switch 4, wire 131, to the red signal 67ᶜ on C street thence through return wire 75.

The newly established circuit for the amber light on B street is as follows: Feed wire 60, wire 68, junction 69, wire 70, engaged terminal 21 and contact 25 of the master relay 2, wires 107, 108, wire 154, engaged terminal 41 and contact 44 of the double throw switch 4, wire 155, engaged terminal 32 and contact 36 of the double throw switch 3, thence through wire 167, through another pair of engaged contacts of the four pole double throw pedestrian switch 61 then through wire 168 to the amber signal 66 on B street thence through the return wire 75. Also, while the current is passing through the wire 167, leading from the contact 36 of the double throw switch 3, it passes through wire 169 (still referring to Figure 6) through the heating coil 170 of the normally open switch 171 in the starting circuit for the electro-magnet for the double throw switch 4, and as the coil 170 heats it brings the terminal 172 of the switch 171 into engagement with the contact 173 in the starting circuit. When this occurs, referring to Figure 7, the circuit through the magnet 40ª for the double throw switch 4 is closed, thus throwing the switch arm 40 thereof to bring the terminals 41, 42 and 43 into engagement with the contacts 47, 48 and 49. When this occurs, the green signal is displayed on C street and the red signals on A and B streets and coil 170 of thermal switch 171 is deenergized.

The closed starting circuit through the thermal switch 171 is as follows: Line 60, wire 68, junction 69, wire 70, terminal 21 and contact 25 of the master relay 2, wires 107, 108, wire 174 through electro-magnet 40ª, thence through wires 175, 176 through the engaged contact 173 and terminal 172 of switch 171 and thence through the frame of the switch 171 to the return wire 98.

The stick circuit is the same as before for the starting circuit to the magnet 40ª, that is, from the line 60, through the electro-magnet 40ª and wire 175 thence through the now engaged contact 49 and terminal 43 of the double throw switch 4 thence through wire 177 to the other feed wire 61. The heating coil 170 of thermal switch 171 is now deenergized. The circuit for the green signal 65ᶜ on C street is as follows: From wire 60, through the wire 68, junction 69, wire 70, terminal 21 and contact 25 of the master switch 2, through wires 107, 108, wire 154, terminal 41 and contact 47 of the double throw switch 4, thence through wire 178 to terminal 52 of the double throw switch 5 which is engaged with the contact 54, thence through wire 179 to the green signal 65ᶜ on C street, thence through return wire 75. The circuit for the red signal displayed on A street is the same as before and as shown in Figures 5 and 6, the circuit for the red on B street is not quite the same as shown in Figures 3 and 4, but through the double throw switch 4, which has just been operated, from line 60, through wire 130, terminal 42, and contact 48 of double throw switch 4, thence through wire 180 and wire 77 to the red signal 67 on B street.

From the contact 54 of the double throw switch 5, from which the current passes to the green signal 65ᶜ on C street, the current also passes through wire 181 through a normally closed switch 182 corresponding to switches 140 and 161 through the heating coil 114, Figure 7, of the thermal switch 115 in the starting circuit for the electro-magnet 57 of the double throw switch 5, and from the coil to the frame of the switch 115 to the return wire 98.

When the terminal 116 of the thermal switch 115 engages the contact 117, Figure 8, the starting circuit through the electro-magnet 57 for the double throw switch 5, is closed, thus throwing the switch into the position shown in Figure 8. The starting circuit is from the line 60, wire 68, junction 69, wire 70, terminal 21, contact 25, wires 107, 108, 174, and 183, thence through electro-magnet 57 and wire 119, through the contact and terminal 117 and 116 and the frame of the thermal switch 115. The stick circuit is the same to the electro-magnet 57 and then from the electro-magnet 57 through the engaged contact 15 and terminal 55 and 51 of the double throw switch 5 thence through wire 122 to the feed wire 61. Upon the throwing of the double throw switch 5, the amber is displayed on C street, and the red on A and B streets. The amber light circuit for the C street will now be described:

From wire 60, through wire 68, junction 69, wire 70, terminal 21 and contact 25, of double throw switch 2, wires 107, 108, wire 154, terminal 41, and contact 47 of double throw switch 4, wire 178, to terminal 52 of the movable switch member 50 of the double throw switch 5, which is in contact with terminal 56, thence through wire 12, engaged contact and terminal of the four pole double throw switch 6 for the pedestrian period thence, through wire 185 to the amber light 66ᶜ of C street. The circuits for the red signals 64 and 67 for A and B streets are the same as in Figure 7. Upon the throwing of the double throw switch 5, the heating coil 115 of thermal switch 117 is deenergized and the switch 117 opens.

The next stage of the cycle is the transfer back to the starting period of the cycle with green on A street, and red on B and C streets after the amber has been displayed on C street a predetermined period.

This is effected by opening the normally closed switch in the stick circuit for the double throw switch 2 and therefore, breaking all the stick circuits, as when the stick circuit through the double throw switch 2 is broken, the circuits through the electro-magnets 27, 37, 40ª and 57 are broken. The opening of the switch 97 in the stick circuit is, as before described in connection with Figure 1, by heating the coil 125 through the wire 126, which is cut into the closed circuit when the double throw switch 5 is thrown by its electro-magnet 57. As the coil 125 heats, the frame of the switch 94 warps, separating its terminal 96 from the contact 95 thus breaking the stick circuit of the electro-magnet 2, so that all switches return to their position shown in Figures 2 and 3, in which position the heating coil 125 of thermal switch 97 is deenergized and returns to its normal position in which contacts 95 and 96 are closed. The double throw switch 1 had returned to its normal position immediately when the double throw switch 2 was operated by its electro-magnet 29. Thus, the timer is at the start of its cycle and beginning to repeat.

It will be noted that each double throw switch has a starting circuit having a normally open switch therein, and a heating coil circuit, and the heating coil circuit is closed when that switch, as for instance, the double throw switch 1, is in its starting position, and the heating coil acts as a timer to close the starting circuit of the companion electro-magnet 17. When this switch is thrown by its electro-magnet, the heating coil of the next double throw switch 2 is cut into a closed circuit and while this coil is heating, the next period of the cycle is taking place, for instance, amber following the green on A street.

Then, when the heating coils for the starting switch for the electro-magnet of the double throw switch 2 are heated, the starting circuit is closed, and double throw switch 2 operated for the second period of the cycle, that is, green on B street, and red on A and C streets. During this period, the heating coils for the third thermal switch are being energized, and when the double throw switch 3 is thrown and other circuits closed and some open, the heating coils for the starting switch of the next double throw switch are being heated, and when the last double throw switch is thrown, the heating coils of the normally closed thermal switch in the stick circuit are being heated to open it so that the double throw switches return to normal position, and the throwing of each succeeding double throw switch is controlled by the throwing of preceding double throw switch. Hence, the sequence of operation of the double throw switches is maintained and the timer can not possibly get out of step as each succeeding relay is controlled by the throwing of the preceding relay.

If there were no timing elements in the starting circuits for the double throw switches, these switches would operate rapidly in succession, but by the introduction of a timing element, as the heating coil, which heating coil is controlled by the flow of current through its companion double throw switch, the different periods of the work cycle can be accurately timed. Also, all the heating coils are controlled by the master double throw switch 2, and the heating coil for each double throw switch is in a closed circuit when that double throw switch is in its starting position, and this heating coil circuit is broken as soon as the switch is thrown by its electro-magnet.

For instance, the switch 1 is in a closed circuit through switch 2 when both are in their starting position. The heating coil 101 for the master switch 2 is in a closed circuit when the master switch is in its starting position, and when the switch 1 is in its operated position. Also, the heating coil 158 of its companion double throw switch 3 is in a closed circuit when the double throw switch is in its starting position after relay switch 2 has been thrown by its electro-magnet. The heating coil paired with double throw switch 4 is in an open circuit while switch 4 is in its starting position, and is controlled through switch 4 in its starting position, and is thrown into a closed circuit by the throwing of the preceding switch 3 by its electro-magnet, and the same operation is also true of the switch 5 and further, these heating coil circuits are broken by the throwing of the companion switch by its electro-magnet. Hence, the throwing of the switches of the series is a progressive one, and the time extent intervening between the throwing is determined by the heating coils, and the heating coils time the various periods of the cycle. Any one of these time periods may be extended or shortened by adjusting the contact of the thermal switch relatively to the terminal of that switch to separate it more or less, as will be hereinafter set forth, and the adjustment of any one thermal switch will not effect the adjustments of the other switches, or will not throw the timer out of step or synchronism.

The mechanism for producing the all amber, and red, pedestrian period, will now be described.

In the illustrated embodiment of my invention, the pedestrian period follows the display of amber on A street, and during the pedestrian period, the amber and red signals are set on all streets. After the regular amber period following the green on A street, the amber signals, together with all red signals, are set for a predetermined period on all streets, and following the all amber and red pedestrian period, the amber is restored for a second variable amber period on A street only, and the red signals persist on B and C street, but are extinguished prior to stepping into the next period in which green is displayed on B street, with red on A and C streets.

When the pedestrian period is used, see Figure 9, the switch 152 is thrown to engage the contact P, and out of engagement with the contact N, and after the amber period following the green of street A, the switches and circuits are as shown in Figure 9. The pedestrian period is a display of the amber on all streets, and the red on all streets. With the pedestrian switch 152 thrown to close the circuit through the contact P and the double throw switches and circuits as shown in Figure 9, the display of all amber and red is accomplished by throwing the double throw switches 6, 7, by energizing the electro-magnets of these switches. The double throw switch 6 is a four pole switch and comprises a movable member 600 having terminals 610, 620, 630, 640 normally engaged with contacts 650, 660, 670, and 680, and movable into engagement with contacts 611, 622, 633, and 644, when the electro-magnet 690 is energized to throw the movable switch member 600 into second position.

The double throw switch 7 is a two pole switch including a movable member 700 having terminals 710, 720, normally engaged with contacts 730, 740, and shiftable by its electro-magnet 750 into engagement with contacts 760 and 770.

Referring to Figure 9, when the pedestrian switch 152 is thrown to cut in the double throw switches 6, 7, the circuits for the pedestrian period, that is, all amber and all red following the display of amber on street A is as follows:

It will be remembered that the circuit for the amber light 63 on street A is closed, by reason of the double throw switch 1 having its terminals 11 and 12 engaged with the contacts 15 and 16, as in Figure 4, in the operation just described, without the pedestrian period, and when in this position, the current flows as before to the contact 16 through terminal 21 and contact 23 of the master double throw switch 2 in normal position, and terminal 12 and contact 16 of the double throw switch 1 when in its thrown position, and from the contact 16, through wire 92, to the amber signal 63 of A street, and through wire 150 and thence, through wire 200, through the frame of a normally closed thermal switch 201, through the engaged terminal and contact 202, 203, wire 204, through the coil 690, thence out through contact P, wire 205, and the engaged contacts 206 of the pedestrian switch 152 thence, through wire 153, and through the frame of the closed thermal switch 102, this switch having been closed in the regular operation by its heating coil. The current also passes from wire 200, through the electro-magnet 750, and through the wire 205, pedestrian switch 152, wire 153, frame of switch 102, to the return wire 98. At the same time, the current is passing through the heating coil 208 of the thermal switch 201, through wire 209 thence through the terminal and engaged contacts 770, 720, of double throw switch 7, and through wire 210, to the return wire 61. As the heating coil 208 heats, it warps the switch 201 to separate the terminal 202 from the contact 203, thus breaking the circuit through the electro-magnet 690, so that it returns to its normal position. Before its return to its normal position, the pedestrian period is in progress, and the red signals are displayed on all three streets and also, the amber signals.

The amber signal at street A was being displayed just previously to the pedestrian period from wire 60, through wire 68, junction 69, wire 10, terminals 21 and 23 of switch 2, wires 71, 72, terminals 12 and 16 of switch 1 thence through wire 92, while the red on B street was displayed as in Figure 4, through wires 60, 68, junction 69, wire 70, terminal 21, and contact 23, of the master switch 2, thence through wire 77, to the red signal 67 of B street, and thence through the return wire, while the red signal on street C was closed from wire 60, through wire 130, terminal 42, and contact 45 of double throw switch 4, and wire 131 through the red signal 67c, thence completing the circuit through the return wire.

During the pedestrian period, the red signals and amber signals are displayed on all streets and hence, when the double pole pedestrian switch 6 is thrown, it is merely necessary to cut in the amber signals on B and C streets, and the red signal on A street.

Referring to Figure 9, when the double throw switch 6 is actuated by its electro-magnet 690, the circuits are as follows: Wire 60, through wire 211, contact 644, terminal 640, and wire 212, to the amber signal of C street thence, through the return wire, while the circuit for the amber signal for B street is through wire 211, contact 633, terminal 630, and wire 213, and thence, through the return wire. The circuit for the red signal on street A, is through wire 211, contact 622, terminal 620, and wire 157, to the red signal of A street and thence, through the return wire. The terminals 622, 633, and 644, of the double throw switch arm 600, are electrically connected together so that they act as a unit.

Immediately upon the deenergizing of the electro-magnet 690, as previously described, the double throw switch arm 600 returns to its normal position, Figure 9, whereupon the amber is again displayed on A street, while the red persists on B and C streets preliminary to the change to red on A street, and green on B street. Also, another signal, as a bell 224 is sounded to notify pedestrians that the pedestrian period is at an end.

The red signal circuit for street C is the same as in Figures 2 and 9, and also the red signal circuit for B street is the same as in Figure 2. However, the amber circuit for street A is slightly different as the heating coil 101 has cooled off, and the contacts 103 and 104 have separated so that now the electro-magnet 27 for the master switch 2 must be energized independently of the switch 102. Double throw switch 7 being still held in its actuated position by its electro-magnet 750, the circuit is as follows: From double throw switch 1, through the wires 92, 150, as before described, thence through wire 200, to terminal 710 of double throw arm 700, which is engaged with contact 760, thence through wire 215, to terminal 610 of double throw arm 600, which is engaged with contact 650, thence through wire 216, through the heating coil 217 of a normally open, thermal switch 218 and through the frame of switch 218 to return wire 219. This switch 218 performs the same function as thermal switch 102 paired with the master double throw switch 2. When the switch 218 is flexed sufficiently to engage its terminal 220 with contact 221, it establishes a starting circuit for the electro-magnet 27 of the double throw switch 2 from wire 60, through wire 68, junction 69, wire 105, electro-magnet 27, through wires 106, 151, and wire 222, which is connected to the terminal 221, thence through terminal 220 and the frame of switch 218, to the return wire 219. With this circuit established, the double throw switch 2 is thrown into its position shown in Figure 5, and the cycle proceeds, as before described, to the end of the cycle. The throwing of the master double throw switch 2 by its electro-magnet 27 thus establishes the stick circuit for the double throw switch 2, and also breaks the circuit through the wire 92 and 150, due to the separation of the terminal 21 from the contact 23 of the double throw switch 2, so that the magnet 750 of the switch 700 is deenergized, and the switch 700 returns to its starting position.

The time it requires for the heating coil 217 to flex the switch 218 to engage the contacts 220 and 221, determines the extent of time the amber only is displayed on street A following the pedestrian street for all streets, the same as the heating coil 101 determines the extent of the amber period immediately following the display of green on A street.

At the same time that the heating coil 217 is cut into the circuit through the terminal 610 and contact 650 of double throw switch 6, the bell circuit indicating to the pedestrians that the pedestrian period is about to close is completed through wire 223, a suitable bell 224, then through return wire 225, wire 205, and engaged contact 770, terminal 720, and return wire 210.

This timer is also provided with time extension means for prolonging any one period, and means is shown as prolonging the green or go period of any one of the streets, and this means is here shown as a thermal switch, and it is necessary to describe only one of them.

The time extension means in this embodiment of my invention acts to delay for a certain timed period the energizing of the heating coils of any one or more of the thermal switches in the starting circuits.

In the illustrated embodiment of the invention, the time extension means, when used, is shown as connected to extend the green or go signals, and the time extension means is shown in connection with the green or go signals on each of the streets A, B, and C, although the extension may be used on any one or more of the streets to the exclusion of the others.

In Figure 10, the extension feature is shown as working on A street only to extend the go or green signal.

The time extension means is here shown as a thermal switch 230 having a heating coil 231, this switch being normally open and having a terminal 232 normally spaced from a contact 233. When the time extension is used, the switch 140 is thrown from its normal position into the position shown in Figure 10. The contact 233 is connected by a wire 234 through one of the contacts of the switch 140 to the heating coil 83 of the switch 80, the switch 140 acting as a cut-out switch interposed between the switches 230 and 80 and operable to cut in and cut out the time extension switch 230, or the heating coil thereof. When the switch 140 is thrown to cut in the time extension switch, and the cycle timer is at the beginning of its cycle, the current passes from feed wire 60, to the switch arm 20 of the switch 2, through terminal 21, contact 23, wires 71, 72, through arm 10 of double throw switch 1, wire 73, thence through wire 74 to the green signal 62 on the A street and also, through wire 84, through the switch 140, wire 235 thence through the frame of switch 230 and through the heating coil 231 to the return wire 85. The coil 231 being in a closed circuit, heats the switch 230 causing it to warp or flex sufficiently to engage the terminal 232 with the contact 233. Thereupon, the current passes, the same as before, through the frame of the switch 230 and the heating coil 231 and also, through the wire 234 to the heating coil 83 of the switch 80 heating the same until it warps or flexes sufficiently to engage its terminal 81 with the contact 82 and thus close the starting circuit through the electro-magnet 17, as before explained. Therefore, the timing of the switch 80 is additionally controlled by the heating coil 231, and the green signal will be displayed during its regular period and during an extended period, depending on the time it requires the coil 231 to heat sufficiently to flex the switch 230 and engage its terminal 232 with the contact 233.

In the illustrated embodiment of my invention, the go or green circuits on each of the other streets is provided with a similar time extension switch 236 and 237 controlled by the switches 161 and 182.

The switches 80 and 231 are thus successively operated timed switches, the timing of the switch 80 being controlled by the closing of the switch 231, each of these switches having electrically operated means, as heating coils, which are connected successively in the same heating coil circuit, the coil 231 by the companion double throw switch, and the coil 83 by the closing of the switch 230 by its heating coil 231. When the switch 230 closes, the heating coils 231 and 83 are connected in multiple in the same circuit. In so far as this invention is concerned, the switches 140, 161, 182, and 152, may be operated manually, as by the traffic officer, but in many instances, they are operated automatically in any well known manner by a timed movement.

The purpose of these extension switches is to extend the go signals on the main street during certain hours of the day when traffic increases above normal. For instance, between the hours of eight and nine in the morning, and five and six in the evening, the traffic on the main highway may be greater than during the other hours, and the traffic on the cross streets normal, or subnormal, so that it is desirable in order to keep the traffic flowing smoothly to give a longer go period on the congested street or streets without extending the go period on the other streets.

In operation, it is obvious that when the switch 140, or 182, is thrown into the position shown in Figure 10, the green or go signal circuit will be held open a longer period than normal, due to the fact that the starting circuit for the electro-magnet 17, which is normally controlled by the thermal switch 80 can not close until the heating coil 231 of the switch 230 has closed the switch 230. Likewise, the throwing of the switches 161, 182, will cause the green signals on B and C streets respectively to be prolonged.

This cycle timer is particularly advantageous in that it consists of simple, inexpensive units, a starting unit, an ending unit, and any number of intermediate units, each unit consisting merely of a double throw switch, and a timing, or thermal switch, and that to increase the capacity of the timer, that is, to increase the number of work units it may control, it is merely necessary to add additional intermediate units and thereby may be utilized in the signalization of 3, 4, 5, 6, or any number of intersecting streets. In the construction here shown, the units including the switches 1, 2, may be considered the starting unit, the ending unit consisting of the double throw switch 5 and its thermal switch 115, and the intermediate unit consisting of the switches 3, 4, and 6, 7, if used together with their thermal switches.

The general operation has been described heretofore herein, and it will be noted that this cycle timer includes a series of successively operable double throw switches normally arranged in starting position, that the throwing of the first switch times the throwing of the second, and the second times the third etc., and that the last switch of the series times the resetting of all the switches in starting position.

What I claim is:

1. A cycle timer including a series of successively operable double throw switches, each having a movable member and each having means for initially throwing said member into its starting position, electro-magnets, one for each switch, for throwing the member thereof into its second position, a feed circuit, and work circuits connectable in the feed circuits through the double throw switches, starting circuits for the magnets, the starting circuit for the first magnet being connected in the feed circuit through the member of the first double throw switch when in its starting position, and the movable member of the first switch, when in starting position, being connected in the feed circuit through the movable member of the second switch when the latter is in its starting position and similarly when the movable member of the first switch is in its second position, a normally open thermal switch in each starting circuit, a heating coil arranged in juxtaposition to each starting switch to heat and flex the same to close the companion starting circuit, the heating coil of the first starting circuit being connected in the feed circuit through the said member of the first double throw switch when in its starting position, and the heating coil of the second and each succeeding starting circuit switch being connected in the feed circuit through the preceding double throw switch when in its second position, a second series of switches one for each of the first said series of double throw switches, and each having a member movable in correspondence with the said movable member of the companion switch in said first series, stick circuits for the electro-magnets each stick circuit including one of said second series switches when in its second position, and timed means operated by the last of the double throw switches when in its second position for opening the stick circuits that are closed.

2. A cycle timer including a series of successively operable double throw switches, a feed circuit, and work circuits to be timed, connected in the feed circuit through the double throw switches, the switches being normally arranged in starting position, electro-magnets, one for each double throw switch, for throwing them into their second position, timing means connected in the feed circuit by the first switch of the series when in starting position for controlling the closing of the starting circuit through the electromagnet of the first switch, and timing means connected in the feed circuit by each of the switches when in its second position for closing the circuit through the electro-magnet of the next succeeding switch, a second series of switches one for each of the first said series of double throw switches, and each having a member movable in correspondence with the said movable member of the companion switch in the first series, stick circuits for the magnets each including one of said switches of the second series when in second position, and timing means common to all of the stick circuits which are closed when the stick circuit for the last double throw switch of the series is closed and connected in the feed circuit by the throwing of the last switch of the series to its second position for opening all of the closed stick circuits simultaneously, the first double throw switch of the series being connected in the feed circuit through one of the other double throw switches when the latter is in its starting position.

3. A cycle timer including a series of successively operable double throw switches, a feed circuit, and work circuits to be timed, connected in the feed circuit through the double throw switches, the switches being normally arranged in starting position, and shiftable into a second position, means for throwing the switches to their second position, and timed means for controlling the successive operation of the throwing means, there being a timed means paired with each switch, the timed means of the first switch being connected in the feed circuit thereby when in its first position, and the timed means of each succeeding switch being connected in the feed circuit by the preceding switch when in its thrown position, and means operated by each of the switches when thrown to its second position for cutting out the timing means therefor, means for effecting the holding of the second and each succeeding switch in its thrown position, and electrically operated timed means controlled by the last switch of the series when in its second position for releasing the second and succeeding switches simultaneously, the first switch of the series being connected in the feed circuit through the second switch when in its starting position and disconnected from the feed circuit when the second switch is in its second position.

4. A cycle timer including a series of double throw switches, each having means for initially throwing the same into its starting position, an electro-magnet, one for each double throw switch for throwing the same into its second position, one of said switches being a master switch, a starting circuit for each magnet, and a stick circuit for each magnet, each starting circuit having a normally open thermal switch therein, a heating coil arranged in juxtaposition to each thermal switch and operating when energized, to close the starting switch, the heating coil of the first switch of the series being connected in the feed circuit through the first and second switches when in starting position, and the starting circuit of the second switch being connected in the feed circuit through the first switch when in its second position, and the heating coil for the normally open thermal switch of the third magnet being connected in the feed circuit through the second and third switches, when the second switch is in its second position and the third switch is in its first position, the stick circuit for the first switch being connected in the feed circuit when the first switch is in its second position and the second switch in its first position, the stick circuits for the second and third double throw switch being connected in the feed circuit when said switches are in their second position and a normally closed thermal switch in the stick circuits having heating coils, which, when energized, open the same, the heating coils being connected in the feed circuit through the third switch when in its second position.

5. A cycle timer including a closed series of double throw switches, each having means for initially throwing the same into its starting position, an electro-magnet, one for each double throw switch for throwing the same into its second position, a starting circuit for each magnet, each starting circuit having a normally open thermal switch therein, a heating coil arranged in juxtaposition to each thermal switch and operating, when energized, to close the starting switch, the heating coil for each starting switch, except for the first of the double throw switches, being connected in the feed circuit through the preceding double throw switch of the series, when the latter is in its second position, and the heating coil for the starting switch for the first of the double throw switches of the series being connected in the feed circuit through the first double throw switch when in its first position and the succeeding double throw switch when in its first position, stick circuits for the double throw switches and a normally closed thermal switch connected in all the stick circuits that are closed when the stick circuit of the last double throw switch of the series is closed and having a heating coil arranged in juxtaposition thereto to open the same, when energized, the heating coil circuit of the normally closed thermal switch being connected in the feed circuit through the last of the switches of the series when in its second position, all whereby the double throw switches are successively operated and controlled in their operation by the preceding switch of the closed series and the cycle repeats after the operation of the last double throw switch of the series.

6. A cycle timer including a first series of successively operable double throw switches, a feed circuit and work circuits to be timed connected in the feed circuit through said double throw switches, the switches being normally arranged in starting position, means for moving them to starting position, electro-magnets, one for each switch and being operable to throw said switches to their second position, a starting circuit for each electro-magnet having a normally open switch therein, stick circuits for said electro-magnets, a second series of switches, one for each of the first said series of double throw switches, each having a member movable in correspondence with the said movable member of the companion switch of the first series, each of said stick circuits including one of the switches of said second series when the movable member thereof is in its second position, a normally closed switch connected in circuit with all the stick circuits that are closed when the stick circuit for the last double throw switch of the series is closed, a heating coil arranged in juxtaposition to each of the starting circuit switches to close the same when heated, the heating coil of the first starting switch being connected in the feed circuit through the first switch when in its starting position, and the heating coils for each of the other starting switches being connected in the feed circuit through the preceding double throw switch when in its second position, a heating coil arranged in juxtaposition to the stick circuit for opening the same when heated and connected in the feed circuit through the last of the double throw switches of the first series when in its second position; and a time extension circuit connected in one of the starting circuits and having a normally open thermal switch therein in series with the heating coil of the starting switch in said circuit, the extension switch having a heating coil connected in the companion starting circuit through the movable switch member of the companion double throw switch when in its first position, and a switch means operable to cut the extension switch circuit into and out of the starting circuit.

HERBERT J. BRANDENBURGER.